3,261,889
POLYETHYLENE-CONTAINING MATERIAL HAVING AN INCREASED RESISTANCE TO ENVIRONMENTAL STRESS CRACKING
Johan W. F. van 't Wout, Sittard, Netherlands, assignor to Stamicarbon N.V., Heerlen, Netherlands
No Drawing. Filed Sept. 8, 1965, Ser. No. 485,925
Claims priority, application Netherlands, Jan. 15, 1960, 247,418
6 Claims. (Cl. 260—897)

This is a continuation-in-part of Serial Number 81,255 filed January 9, 1961, now abandoned.

The present invention relates to a method of preparing a polyethylene-containing material having an increased resistance to environmental stress cracking, i.e., the formation of cracks in the material when the latter is subjected to stress while it is submerged in a liquid, such as a fat or, in particular, in a solution of a surface-active material.

In the preparation of polyethylene with a density ($d_4^{23}$) of 0.91–0.93 by the so-called high-pressure method, which is carried out at pressures over 500 atm., the resulting products sometimes combine otherwise good mechanical properties with an unduly low resistance to environmental stress cracking. This resistance is in particular important for materials of which tubes and bottles are to be made, these materials having in general a "melt-index" or 0.1–3. However, the low resistance to environmental stress cracking of materials having a "melt-index" between 3 and 20 is also often undesirable.

The object of the present invention is to provide a method by which polyethylene-containing material with an increased resistance to environmental stress cracking can be produced. More particularly, the object is to provide a method of preparing a polyethylene-containing material which, in addition, has good mechanical properties.

The method according to the invention for the preparation of a polyethylene-containing material having an increased resistance to environmental stress cracking, is characterized by the addition to 100 parts by weight of high pressure polyethylene of 3–30 parts by weight of an atactic copolymer of ethylene with propylene and/or butene-1; an atactic copolymer of ethylene with propylene and 1–10% by weight of a diene containing 5–20 carbon atoms; or mixtures thereof. Preferably, there is added an amount of 5–20 parts by weight.

By an atactic copolymer of ethylene with propylene or butene-1 or of ethylene with propylene and 1–10% by weight of a diene is understood a copolymer, prepared from a mixture of such monomers under the influence of a Ziegler catalyst, and the solubility of which in boiling hexane is greater than 20 grammes per liter. These copolymers have a linear, head-to-tail configuration not present in the other amorphous polymers, and such copolymers have been described in British Patents 856,736 and 856,737.

Examples of atactic copolymers of ethylene with propylene and a diene containing 5–20 carbon atoms, which can be used according to the present invention, are copolymers of ethylene with propylene containing 1–10% by weight of pentadiene-1,4; hexadiene-1,4; 2 furyl hexadiene-1,4; octadiene-1,5; monovinyl cyclohexene; cyclopentadiene; dicyclopentadiene; cyclooctadiene-1,5; 5-alkenyl-2-norbornenes; 2-alkyl-2,5-norbornadienes; and tetrahydroindene.

By catalysts of the Ziegler type are to be understood catalysts capable of polymerizing ethylene at atmospheric pressure to a product solid at room temperature, said catalyst being formed by adding at least one compound of a metal of the Groups 4–8, inclusive, of the Periodic System—e.g., a titanium chloride—to a metal, an alloy, a metal hydride, or an organometallic compound of the Groups 1–3, inclusive, of the Periodic System, whether or not in the presence of other substances, e.g., aluminum chloride.

The invention will be further explained by means of the following examples, in which the resistance to environmental stress cracking is determined by the so-called "Bell Telephone Test."

According to this test, a test strip in which a notch has been made is bent to a semi-circle and clamped in position in this shape, and then kept at 50° C. in a concentrated solution of a non-ionic soap (trade name: "Lissapol").

The dimensions of the test strip were 38 x 12.7 x 3.2 mm. The depth of the notch was 0.5 mm.

In preparing the test strips, a cooling rate of about 40° C. per minute was applied. Measurements were made of the environmental stress cracking number, i.e., the number of hours elapsing before 5 of the 10 test strips showed one or more cracks.

The mixing of the materials was done in a kneader or on a roller at temperatures of 110–135° C. for about 10 minutes.

EXAMPLE 1

An amount of polyethylene prepared by the high-pressure process and having an environmental stress cracking number of 1.5 was mixed with an atactic copolymer of ethylene, propylene and dicyclopentadiene containing 41% by weight of propylene and 3.6% by weight of dicyclopentadiene and having a Mooney plasticity (ML 4–212° F.) of 45 in the amounts set out in Table I; the atactic copolymer was prepared by polymerizing ethylene, propylene and dicyclopentadiene with the aid of vanadium oxychloride and ethyl aluminum dichloride in gasolene.

*Table I*

| Addition, percent by wt.: | Environmental stress cracking number |
|---|---|
| 0 | 1.5 |
| 3 | 4.5 |
| 5 | 7 |
| 10 | 15 |
| 20 | >300 |

From Table I, it is seen that by addition of 3% by weight of atactic material the environmental stress cracking number is already trebled. Addition of 20% by weight causes it to rise above 300. To obtain the optimum properties it is generally preferred to add 5–20% by weight of the atactic copolymer.

EXAMPLE 2

An amount of high pressure polyethylene having an environmental stress cracking number of 0.8, was mixed with 10% by weight of a so-called Ziegler ethylene-propylene copolymer containing 35 mol percent of propylene. The environmental stress cracking number was raised thereby to 25.

When the same amount of butyl rubber was added to the same polyethylene, there was obtained almost the same environmental stress cracking number, viz., 24, but the product thus obtained was less white, and the discoloration increased in course of time.

The copolymer used was prepared by polymerizing a mixture of ethylene and propylene under the influence of titanium tetrachloride and aluminum alkyls.

EXAMPLE 3

An amount of high pressure polyethylene having an environmental stress cracking number of 1.5, was mixed with a so-called Ziegler ethylene-propylene copolymer containing 53% by weight of propylene and having a Mooney plasticity (ML 4–212° F.) of 50, in the amounts set out in Table II.

*Table II*

| Addition, percent by wt.: | Environmental stress cracking number |
|---|---|
| 0 | 1.5 |
| 3 | 3 |
| 5 | 5 |
| 10 | 12 |
| 20 | >300 |

When in departing from the process according to the invention, 10% by weight of polyisobutylene was added instead of the atactic copolymer, the environmental stress cracking number rose to only 2.

When in departing from the process according to the invention, 10% by weight of isotactic polypropylene was added, the cracking number was not changed but remained 0.3. Moreover, the elongation at rupture dropped to only 75%.

The aforementioned isotactic polypropylene was prepared by separating out the solid particles of the suspension formed in the polymerization of propylene with the aid of titanium trichloride, aluminum alkyls and gasolene, and removing the remaining atactic material from these particles by extraction with boiling hexane.

It is difficult to give an explanation for the favorable action of the atactic material, which probably consisted almost entirely of linear polymer molecules and in which the substituents for the carbon atoms carrying methyl groups did not have the same configuration over large parts of the length of the polymer molecules.

What is claimed is:

1. A method of preparing a polyethylene-containing material having an increased resistance to environmental stress cracking, comprising the step of: adding to 100 parts by weight of high pressure polyethylene, 3–30 parts by weight of a member of the group consisting of atactic copolymers of ethylene and propylene; atactic copolymers of ethylene and butene-1, and mixtures thereof, said atactic copolymers being formed in the presence of a catalyst formed by adding at least one compound of a metal of the groups 4–8, inclusive, of the Periodic System to a compound selected from the group consisting of a metal, an alloy, a metal hydride, and an organo-metallic compound of the groups 1–3, inclusive, of the Periodic System.

2. The method of claim 1, wherein the amount so added ranges between 5–20 parts by weight.

3. As a composition of matter: a mixture of 100 parts by weight of high pressure polyethylene and of 3–30 parts by weight of a member of the group consisting of atactic copolymers of ethylene and propylene; atactic copolymers of ethylene and butene-1 and mixtures thereof, said atactic copolymers being formed in the presence of a catalyst formed by adding at least one compound of a metal of the groups 4–8, inclusive, of the Periodic System to a compound selected from the group consisting of a metal, an alloy, a metal hydride, and an organo-metallic compound of the groups 1–3, inclusive, of the Periodic System.

4. The composition of claim 3, containing 5–20 parts by weight of the atactic member.

5. Molded articles, especially tubes and bottles, made of a polyethylene-containing material having an increased resistance to environmental stress cracking, said material comprising a mixture of 100 parts by weight of high pressure polyethylene and 3–30 parts by weight of a member of the group consisting of atactic copolymers of ethylene and propylene; atactic copolymers of ethylene and butene-1, and mixtures thereof, said atactic polymers being formed in the presence of a catalyst formed by adding at least one compound of a metal of the groups 4–8, inclusive, of the Periodic System to a compound selected from the group consisting of a metal, an alloy, a metal hydride, and an organo-metallic compound of the groups 1–3, inclusive, of the Periodic System.

6. Molded articles according to claim 5 containing 5–20 parts by weight of the atactic copolymer.

References Cited by the Examiner
UNITED STATES PATENTS

| 3,036,987 | 5/1962 | Ranalli | 260—897 |
| 3,176,052 | 3/1965 | Peticolas | 260—897 |

SAMUEL H. BLECH, *Primary Examiner.*

E. B. WOODRUFF, *Assistant Examiner.*